(12) United States Patent
Luan et al.

(10) Patent No.: US 12,084,351 B2
(45) Date of Patent: Sep. 10, 2024

(54) CARBON DIOXIDE EXTRACTION USING FLUIDIC ELECTROPHORESIS

(71) Applicant: International Business Machines Corporation, Armonk, NY (US)

(72) Inventors: Binquan Luan, Chappaqua, NY (US); Rodrigo Neumann Barros Ferreira, Rio de Janeiro (BR); Breanndan O'Conchuir, Warrington (GB); Anshul Gupta, Valhalla, NY (US); Fausto Martelli, Stockton Heath (GB); Mathias B Steiner, Rio de Janeiro (BR); Tonia Elengikal, Long Island City, NY (US)

(73) Assignee: International Business Machines Corporation, Armonk, NY (US)

( * ) Notice: Subject to any disclaimer, the term of this patent is extended or adjusted under 35 U.S.C. 154(b) by 271 days.

(21) Appl. No.: 17/363,084

(22) Filed: Jun. 30, 2021

(65) Prior Publication Data
US 2023/0020787 A1 Jan. 19, 2023

(51) Int. Cl.
*C01B 32/50* (2017.01)
*B01D 53/22* (2006.01)
*B01D 53/32* (2006.01)
*B01D 57/02* (2006.01)

(52) U.S. Cl.
CPC .............. *C01B 32/50* (2017.08); *B01D 57/02* (2013.01); *B01D 2257/504* (2013.01)

(58) Field of Classification Search
None
See application file for complete search history.

(56) References Cited

U.S. PATENT DOCUMENTS

| | | |
|---|---|---|
| 5,865,974 A | 2/1999 | Cabilly |
| 6,541,272 B1 | 4/2003 | Mitra |
| 6,974,528 B2 | 12/2005 | Liu |
| 8,721,861 B2 | 5/2014 | Weber |

(Continued)

FOREIGN PATENT DOCUMENTS

| | | | |
|---|---|---|---|
| CA | 2639953 A1 * | 8/2007 | ......... B01D 53/1418 |
| CN | 100411714 C | 8/2008 | |

(Continued)

OTHER PUBLICATIONS

Kiani, et al., "Techno-Economic Assessment for CO2 Capture From Air Using a Conventional Liquid-Based Absorption Process." Published May 29, 2020. 13 pages. In Front. Energy Res. vol. 8. Article 92. Published by Frontiers in Energy Research. https://www.frontiersin.org/article/10.3389/fenrg.2020.00092.

(Continued)

*Primary Examiner* — Daniel Berns
(74) *Attorney, Agent, or Firm* — Heather Johnston

(57) ABSTRACT

A system may include a chamber with a main sub-chamber and a first porous membrane separating a first sub-chamber from the main sub-chamber. The system may include a fluid in the chamber and an input directing inflow into main sub-chamber proximate an entry end of the chamber. The system may include a first output permitting outflow from the first sub-chamber proximate an exit end of the chamber wherein a molecule entering at the entry end must traverse a length of the chamber to exit at the exit end.

9 Claims, 4 Drawing Sheets

(56) References Cited

U.S. PATENT DOCUMENTS

| | | |
|---|---|---|
| 9,192,943 B2 | 11/2015 | Medoro |
| 2006/0254919 A1* | 11/2006 | Jangbarwala .......... B01D 57/02 204/522 |

FOREIGN PATENT DOCUMENTS

| | | |
|---|---|---|
| EP | 0253749 B1 | 10/1991 |
| WO | 2020172111 A1 | 8/2020 |

OTHER PUBLICATIONS

Kim, et al., "Selective Gas Transport Through Few-Layered Graphene and Graphene Oxide Membranes." Published Oct. 4, 2013. 6 pages. In Science, vol. 342, Issue 6154, pp. 91-95. Published by Science Mag. https://science.sciencemag.org/content/342/6154/91.full.

* cited by examiner

CARBON DIOXIDE EXTRACTION USING FLUIDIC ELECTROPHORESIS

BACKGROUND

The present disclosure relates to molecular filtration and, more specifically, to molecular extraction.

Emissions and exhaust may contain molecules that would preferably be recovered. Such emissions and exhaust may include, for example, greenhouse gas emissions in flue gas streams from point source emitters such as power plants, cement plants, steel plants, manufacturing facilities, businesses, homes, and vehicles. Current technologies rely on mechanisms that use filters, adsorbent materials, or absorbent materials that may deteriorate with use and/or over time: after a certain amount of molecules are captured/recovered, materials become saturated and need to be renewed for continued use. The renewal of the extraction materials may require expensive resources such as the application of temperature and/or pressure over time, and the renewal process may require downtime of the system of which the recovery mechanism is a component.

SUMMARY

Embodiments of the present disclosure include a system and method for molecular extraction.

A system in accordance with the present disclosure may include a memory and a processor in communication with the memory. The processor may be configured to perform operations. The operations may include dissolving gaseous molecules in water to form an aqueous solution with cations and anions. The operations may include submitting the aqueous solution to a chamber and guiding the cations to a first sub-chamber of the chamber to form a solution with concentrated cations. The operations may include expelling the solution with concentrated cations.

The operations may further include using an inert electrode to attract the cations to the first sub-chamber.

The operations may further include collecting the anions in a second sub-chamber of the chamber.

The operations may further include catching the solution with concentrated anions in a reservoir and, in the reservoir, mixing the concentrated anionic solution with a precipitation-inducing solution to form a precipitate.

The operations may further include preventing accumulation of the cations and the anions with a pressure-driven flow of the aqueous solution.

A method in accordance with the present disclosure may include dissolving gaseous molecules in water to form an aqueous solution with cations and anions and submitting the aqueous solution to a chamber. The method may include guiding the cations to a first sub-chamber of the chamber to form a concentrated cationic solution and expelling the solution with concentrated cations.

The method may further include using an inert electrode to attract the cations to the first sub-chamber.

The method may further include collecting the anions in a second sub-chamber of the chamber.

The method may further include catching the solution with concentrated anions in a reservoir and, in the reservoir, mixing the solution with concentrated anions with a precipitation-inducing solution to form a precipitate.

The method may further include preventing accumulation of the cations and the anions with a pressure-driven flow of the aqueous solution.

A fluidic system in accordance with the present disclosure may include an input and a chamber in communication with the input. The chamber may be configured to perform operations. The operations may include continuously dissolving carbon dioxide in water and electrophoretically driving a hydron product and a carbonate ion product into different chambers for concentration.

The operations of the fluidic system may further include obtaining an acidic solution as a byproduct.

The operations of the fluidic system may further include obtaining a sodium carbonate byproduct.

The operations of the fluidic system may further include reacting the carbonate ion product with a cation solution to form a solid. Some operations of a system in accordance with the present disclosure may include storing the carbon dioxide as the solid.

A system in accordance with the present disclosure may include a chamber with a main sub-chamber and a first porous membrane separating a first sub-chamber from the main sub-chamber. The system may include a fluid in the chamber and an input directing inflow into main sub-chamber approximate an entry end of the chamber. The system may also include a first output permitting outflow from the first sub-chamber approximate an exit end of the chamber such that a molecule entering at the entry end must traverse a length of the chamber to exit at the exit end.

The system may further include a second porous membrane separating a second sub-chamber from the main sub-chamber. The system may additionally include the main sub-chamber is between the first sub-chamber and the second sub-chamber. The system may additionally include a second output permitting outflow from the second sub-chamber approximate an exit end of the chamber.

The system may further include an external boundary of the chamber and an inert electrode proximate the external boundary.

A method in accordance with the present disclosure may include dissolving emissions in a fluid in a chamber to form an ionic solution and submitting the ionic solution to the chamber. The method may include concentrating first ions in the ionic solution to a first sub-chamber of the chamber to form a concentrated solution and expelling the concentrated solution.

The method may further include guiding the first ions to the first sub-chamber with an electric field. The method may additionally include setting the electric field with an inert electrode.

The method may further include filtering the first ions through a porous membrane in the chamber.

The method may further include filtering the second ions through a selectively porous barrier into a second sub-chamber.

The method may further include electrophoretically driving the first ions to the first sub-chamber and second ions to a second sub-chamber.

The above summary is not intended to describe each illustrated embodiment or every implement of the disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
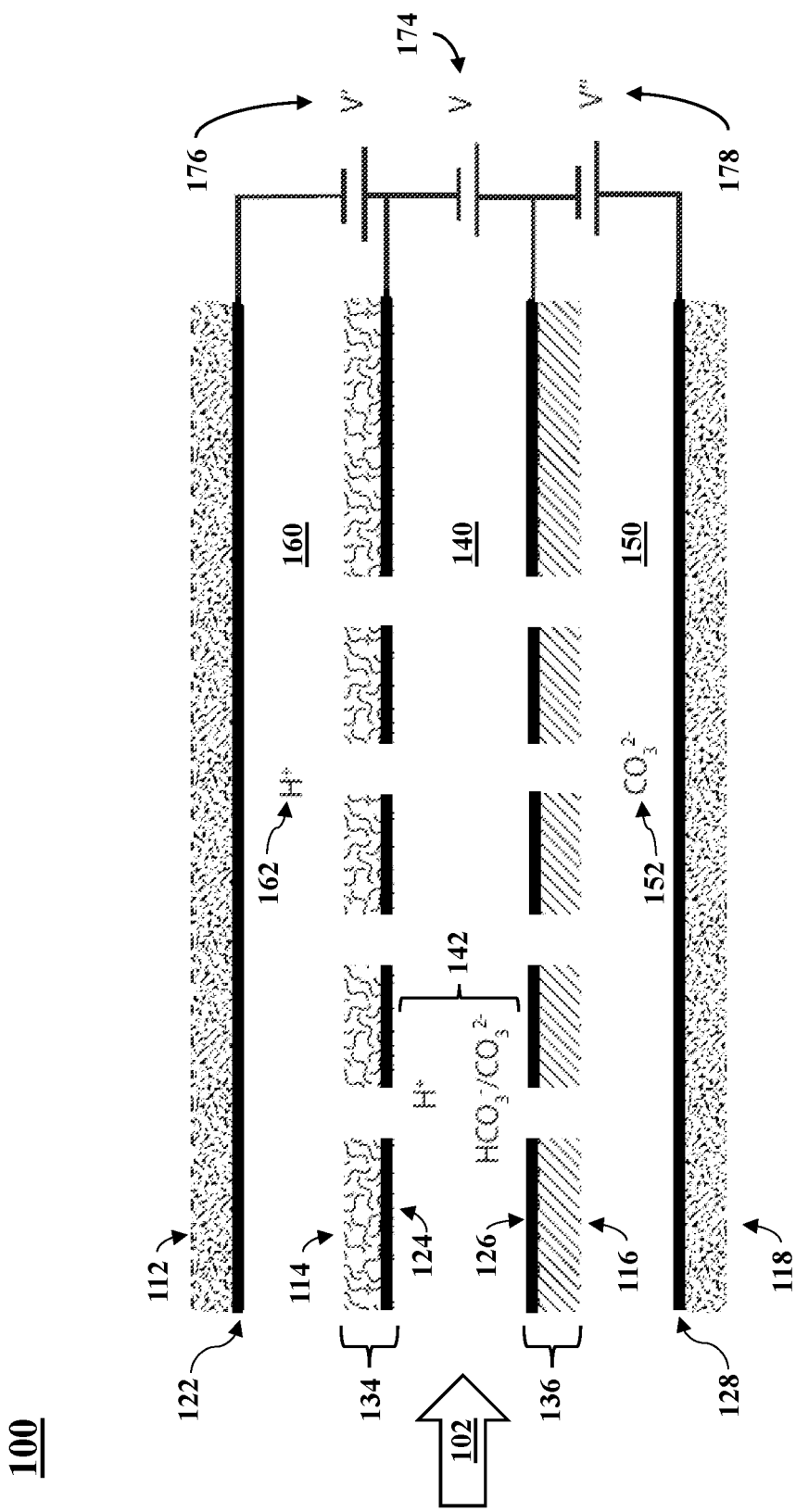
FIG. 1 illustrates a fluidic device in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to molecular filtration and, more specifically, to molecular extraction.

The present disclosure generates an electrophoresis-based separation strategy that does not depend on an adsorbent. The present disclosure may be operated continuously because it is not subject to molecular saturation.

Emissions or exhaust gas may be directed into a chamber with water where target molecules are dissolved into an aqueous solution. The chamber with the water is divided into subsections separated with microporous membranes made of inert materials. Sub-chambers may be set to different electric potentials to generate an electric field perpendicular to the membranes. The electric fields may direct the molecules and molecular components in the aqueous solution to certain sub-chambers. The sub-chambers may be directed to different chamber exits such that the exiting aqueous solutions are concentrated.

The water in the chamber may be deionized and/or demineralized. The chamber may be separated into sub-chambers using microporous membranes. Electric potential for each sub-chamber may be set using, for example, electrodes that can apply different voltages to different sub-chambers. Different voltages applied to different sub-chambers may result in molecules with different charges being drawn to different sub-chambers (e.g., positively charged molecules are drawn to the sub-chambers with relatively lower electric-potentials and negatively charged molecules are drawn to the sub-chambers with relatively higher electric-potentials). Charging the electrodes in respective sub-chambers may thus allow for concentration of target molecules, and molecular concentration may enable or increase efficiency of recovery.

Emissions may include, for example, flue gas containing carbon dioxide ($CO_2$). The flue gas may be directed into a chamber with deionized water, and the carbon dioxide may dissolve into the water to form an aqueous solution. Carbon dioxide may react with the deionized water to form ions such as hydron ($H^+$) hydrogen cations, bicarbonate ($HCO_3^-$), and carbonate ($CO_3^{2-}$). The chamber may be divided into subsections (herein referred to as sub-chambers) using a silicon nitride ($SiN_x$) porous membrane. The sub-chambers may be charged using inert electrodes such that hydrons are drawn into one or more lower electrical-potential sub-chambers whereas the bicarbonate anions are drawn into one or more higher electrical-potential sub-chambers. This process concentrates the anions in certain one or more sub-chambers and the cations in different one or more sub-chambers. The concentrated solutions may then be expelled for extraction and/or reuse of the concentrated ions.

In some embodiments, the present disclosure may be operated continuously. Any downtime (for example, for cleaning and maintenance) may be minimized as the need for pressure and/or temperature cycles (e.g., for cleaning and/or maintenance) may be reduced and/or eliminated. Continuous operation may be achieved by preventing build-up in the separation chamber, and build-up in the separation chamber may be achieved by expelling the concentrated solutions from the separation chamber into reservoirs prior to forming a final product. For example, exhaust gas containing carbon dioxide may be directed into a fluidic device to react with water to form carbonate ions and hydrons. The carbonate ions may be excreted into a reservoir, and a solution rich in sodium may be added to the reservoir to react with it to form sodium carbonate; similarly, the hydrons may be excreted into another chamber and used to form sulfuric acid. Forming the products (here, sodium carbonate and sulfuric acid) in reservoirs rather than the separation chamber prevents build-up of products (precipitate or otherwise) in the separation chamber, thereby enabling continuous operation.

The present disclosure may be used, for example, to separate carbon dioxide from flue gas emitted from point source emitters. Point source emitters may be any mechanism that has an exhaust such as, for example, power plants (including coal and/or natural gas power plants), industrial processes, internal combustion engines, and the like. The present disclosure is scalable to different applications such that it may be used at any size (e.g., a personal vehicle, a home, an apartment complex, a corporate office, or a power plant).

In the present disclosure, a solvent-based method is used to separate gaseous molecules. The present disclosure focuses the separation of carbon dioxide ($CO_2$) from other gas molecules (such as nitrogen $N_2$) in the exhaust (also referred to as emissions or byproduct) of power generation; a person having ordinary skill in the art will recognize that the present disclosure may be used in any application in which one or more gas molecules in a gaseous composition are more soluble in a liquid than other gas molecules in the gaseous composition.

Carbon dioxide has a relatively high solubility in water compared with other gas molecules. Gaseous carbon dioxide ($CO_{2,\ (g)}$) may be mixed with water at a gas-liquid interface to produce aqueous carbon dioxide ($CO_{2,\ (aq)}$). In other words:

$$CO_{2,\ (g)} \rightleftharpoons CO_{2,\ (aq)} \qquad \text{(Equation 1)}$$

In aqueous solution, carbon dioxide may react with water. Specifically:

$$CO_2 + H_2O \rightleftharpoons H_2CO_3 \qquad \text{(Equation 2)}$$

This complex may be ionized with water such that:

$$H_2CO_3 \rightleftharpoons H^+ + HCO_3^- \rightleftharpoons 2H^+ + CO_3^{2-} \qquad \text{(Equation 3)}$$

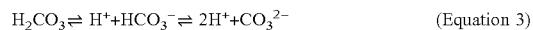

The resulting ions may diffuse away from the gas-liquid interface, facilitating and driving the solvation process of gas molecules such as the solvation of gaseous carbon dioxide as shown in Equation 1. A fluidic device, as discussed in the present disclosure, may be used to collect cations (such as $H^+$ and/or $H_3O^+$) in one sub-chamber and anions (such as $CO_3^{2-}$) in another sub-chamber. The present disclosure uses an electrophoresis method in a fluidic device to enable the continuous dissolution of gas (such as flue gas containing carbon dioxide) in liquid (such as water) to independently obtain a concentrated acidic solution (containing, for example, $H^+$) and a concentrated basic solution (containing, for example, $CO_3^{2-}$) for independent usages. Chemical uses for carbonate include, for example, glass making, silicate fabrication, detergent production, and industrial paper manufacture, among others.

The fluid collecting the anion (e.g., carbonate ion) is basic because the hydrogen ions are collected in a different sub-chamber. In basic conditions, anions (such as carbonate ions) are stable. Specifically, according to Equation 3, carbon dioxide results from carbonate ions if hydron is added to the carbonate. Fluid with a high concentration of carbonate ions may be used for various purposes. Some uses of concentrated carbonate solution may be, for example, to obtain sodium bicarbonate ($NaHCO_3$) or sodium carbonate ($Na_2CO_3$) crystals through crystallization; concentrated carbonate solution may also be used to generate calcium carbonate ($CaCO_3$) or magnesium carbonate ($MgCO_3$) through precipitation.

To identify preferred parameters of devices, methods, and systems used in accordance with the present disclosure, it may be beneficial to identify certain variables such as flow speed and operational conditions. The drifting velocity of a carbonate ion can be calculated as:

$$v = \mu E = \frac{q}{\varepsilon} E = \frac{qD}{k_B T} E = \frac{qDV}{k_B TL} \quad \text{(Equation 4)}$$

wherein v is the drifting velocity of a carbonate ion, $\mu$ is the electrophoretic mobility, E is the electric field, q is the charge of the carbonate ion, $\varepsilon$ is the friction coefficient, D is the diffusion coefficient, $k_B$ is the Boltzmann constant, T is the temperature, V is the biasing voltage, and L is the height of the chamber.

The ionic current through a porous layer may be estimated as:

$$I = jS = \rho evS = \rho eS \frac{qDV}{k_B TL} = \rho qD \frac{S}{L} \cdot \frac{eV}{k_B T} \quad \text{(Equation 5)}$$

wherein I is the ionic current, j is the current density, S is the cross-sectional area of all pores in the porous layer (which may be assumed to be the same as the cross-sectional area of the porous layer), $\rho$ is the ion concentration, and e is the elementary charge.

If the ion concentration $\rho$=1 millimole=$6.02 \times 10^{23}$ $m^{-3}$, V=100 V, D=$10^{-9}$ $m^2$/s, S=100 $m^2$, L=1 m, and q=1 e, then the ionic current I=$2.4 \times 10^{18}$ e/s.

Given such a device and the molecular weight of carbon dioxide of 44 g/mol, the extraction rate of carbon dioxide in the device is $1.8 \times 10^{-2}$ g/s.

The performance of a device may be optimized based on the specific goals of the implementation of a system in accordance with the present disclosure. For example, in some embodiments, it may be preferable to employ a reduced height L. If height L=1 cm and S remains the same at S=100 $m^2$ (e.g., the porous layer has a cross-sectional area of 10 m×10 m), the carbon dioxide extraction rate changes to 1.8 g/s. In some embodiments, units may be stacked; if one thousand of the L=1 cm and S=100 $m^2$ units are stacked, the carbon dioxide extraction rate of the stack would be 1.8 kg/s and the total height of the stack (1,000 units) would be about 40 m.

The energy cost for operating a device in accordance with the present disclosure depends on the energy required to drive the cationic and anionic solutions in the sub-chambers. High pressure may be preferable. High pressure may be used while retaining low operating costs by, for example, employing a minimal height of the separation chamber (e.g., L=1 cm).

Molecules extracted in accordance with the present disclosure may be used to generate various products. For example, carbonate ions could be emptied from a fluidic electrophoresis device in accordance with the present disclosure into a reservoir; a solution rich in calcium ($Ca^{2+}$) and/or magnesium ($Mg^{2+}$) (such as, for example, concentrated sea water) may be added to the reservoir to precipitate calcium carbonate and/or magnesium carbonate. The calcium carbonate and/or magnesium carbonate may be harvested from the reservoir for immediate use, storage, or some combination thereof.

Various benefits of the present disclosure will be recognized by those skilled in the art. These benefits include obtaining useful products such as hydrochloric acid (HCl) and sodium bicarbonate ($NaHCO_3$), procuring stable long-term storage of molecules (for example, storing carbon dioxide in solids such as calcium carbonate and/or magnesium carbonate), and continuously operating the separation procedure (e.g., operation without requiring an energy-intensive cleaning procedure to renew an adsorbent material).

A system in accordance with the present disclosure may include a memory and a processor in communication with the memory. The processor may be configured to perform operations. The operations may include dissolving gaseous molecules in water to form an aqueous solution with cations and anions. The operations may include submitting the aqueous solution to a chamber and guiding the cations to a first sub-chamber of the chamber to form a solution with concentrated cations. The operations may include expelling the solution with concentrated cations.

The operations may further include using an inert electrode to attract the cations to the first sub-chamber. The operations may further include collecting the anions in a second sub-chamber of the chamber. The operations may further include catching the concentrated anionic solution in a reservoir and, in the reservoir, mixing the concentrated anionic solution with a precipitation-inducing solution to form a precipitate. The operations may further include preventing accumulation of the cations and the anions with a pressure-driven flow of the aqueous solution.

A system in accordance with the present disclosure may include a chamber with a main sub-chamber and a first porous membrane separating a first sub-chamber from the main sub-chamber. The system may include a fluid in the chamber and an input directing inflow into main sub-chamber approximate an entry end of the chamber. The system may also include a first output permitting outflow from the first sub-chamber approximate an exit end of the chamber such that a molecule entering at the entry end must traverse a length of the chamber to exit at the exit end.

The system may further include a second porous membrane separating a second sub-chamber from the main sub-chamber. The system may additionally include the main sub-chamber is between the first sub-chamber and the second sub-chamber. The system may additionally include a second output permitting outflow from the second sub-chamber approximate an exit end of the chamber. The system may further include an external boundary of the chamber and an inert electrode proximate the external boundary.

Some embodiments of the present disclosure are fluidic systems. A fluidic system in accordance with the present disclosure may include an input and a chamber in communication with the input. The chamber may be configured to perform operations. The operations may include continuously dissolving carbon dioxide in water and electrophoretically driving a hydron product and a carbonate ion product into different chambers for concentration.

The operations of the fluidic system may further include obtaining an acidic solution as a byproduct. The operations of the fluidic system may further include obtaining a sodium carbonate byproduct. The operations of the fluidic system may further include reacting the carbonate ion product with a cation solution to form a solid and storing the carbon dioxide as the solid.

FIG. 1 illustrates a fluidic device 100 in accordance with some embodiments of the present disclosure. The fluidic device 100 includes a chamber with a main sub-chamber 140, a first sub-chamber 160, and a second sub-chamber 150. The main sub-chamber 140 is separated from the other sub-chambers with porous layers 134 and 136. The fluidic device 100 has channel walls 112 and 118 to define the chamber. The channel walls 112 and 118 may have electrodes 122 and 128, respectively, on them or adjacent to them.

An input 102 may be submitted to the fluidic device 100. The input 102 may include, for example, flue gas or other emissions containing carbon dioxide. The carbon dioxide may react with fluid in the fluidic device 100 to form a solution 142 of anions 152 and cations 162. The fluid may be water; the carbon dioxide may react with the water to form carbonate ions as the anions 152 and hydrons as the cations 162. It may be preferable for the water to be deionized and/or demineralized to minimize or even eliminate buildup in the chamber (e.g., to prevent the carbon dioxide from reacting with calcium and/or magnesium and forming a precipitate in the chamber).

In the second sub-chamber 150, anions 152 may be collected. As the cations 162 are collected in the first sub-chamber 160, the concentration of hydron in the second sub-chamber 150 is low. As a result, in Equation 3, the reaction will be driven toward carbonate ion. In other words, bicarbonate will break down into carbonate ions and hydrons. Fluid expelled from the second sub-chamber 150 may be the input 102 in another fluidic device 100 to further concentrate the carbonate ions in the second sub-chamber 150 of the subsequent fluidic device 100 and further concentrate the hydrons in the first sub-chamber 160 of that device. Enhancing the concentrations may further enable favorable byproducts.

Additional biasing voltages may further attract anions 152 and cations 162 to the desired sub-chambers. A biasing voltage 174 may be applied to the electrodes. There may be an anionic attracting voltage 178 applied to the electrodes 128 near the channel wall 118 adjacent the second sub-chamber 150 to draw anions 152 to the second sub-chamber 150. The anionic attracting voltage 178 may also be applied to the electrodes 126 on the porous layer 136 adjacent the second sub-chamber 150 to further facilitate the attraction of anions 152 into the second sub-chamber 150.

There may be a cationic attracting voltage 176 applied to the electrodes 122 near the channel wall 112 adjacent the first sub-chamber 160 to draw cations 162 to the first sub-chamber 160. The cationic attracting voltage 176 may also be applied to the electrodes 124 on the porous layer 134 adjacent the first sub-chamber 160 to further facilitate the attraction of cations into the first sub-chamber 160.

Accumulation of anions 152 (e.g., carbonate ions) and cations 162 (e.g., hydron atoms) may electrically screen electrodes 122, 124, 126, and 128 and prevent the electrodes 122, 124, 126, and 128 from further collecting anions 152 and cations 162. A pressure-driven flow may be used to propel the ions down the chamber and into exit reservoirs. Separate exits and exit reservoirs may be used for the anions 152 and the cations 162.

The anions 152 may be recovered from the anionic reservoirs to obtain useful products. Such useful products that might result from the extraction of carbon dioxide into a carbonate ion might include, for example, sodium carbonate ($Na_2CO_3$), sodium bicarbonate ($NaHCO_3$), calcium carbonate ($CaCO_3$), and/or magnesium carbonate ($MgCO_3$). In some embodiments, it may be preferable to form the product(s) in the anionic reservoir and recover the product(s) as a precipitate or in crystalline form. In some embodiments, it may not be preferable to form the products in the separation chamber so as to prevent product build-up and enable the fluidic device to run continuously without the need to stop the process for cleaning and/or maintenance.

The cations 162 may similarly be recovered from the cationic reservoirs to obtain useful products. Such useful products that might result from the extraction of carbon dioxide into a carbonate ion and a hydron cation might include, for example, hydrochloric acid (HCl) and/or sulfuric acid ($H_2SO_4$).

In some embodiments, a solution is formed by mixing the flue gas with water, and the solution is sent into a central chamber such as a main sub-chamber 140. The main sub-chamber 140 is sandwiched by two porous layers 134 and 136.

The porous layers 134 and 136 may include a first membrane 114 and a second membrane 116, and the membranes may be coated with electrodes 124 and 126. The electrodes 124 and 126 are inert or nonreactive so as to not allow chemical reactions such as redox reactions.

Electrodes 122, 124, 126, and 128 can be built on the surface of the porous films and chamber surfaces. The electrodes 122, 124, 126, and 28 may be used to yield desired electric fields. Electrodes 124 and 126 may be formed on a layer by spin-coating the layer (e.g., the channel walls 112 and 118, the first membrane 114, and the second membrane 116) with graphene flakes. A biasing voltage 174 may be applied on the electrodes to drive the negatively charged bicarbonate ($HCO_3^-$) and carbonate ion ($CO_3^{-2}$) towards the lower porous layer and the positively charged hydron ($H^+$) towards the upper porous layer and into the first sub-chamber 160.

In some embodiments, the outer chamber walls are plane sheets and can be built using solid materials such as silicon dioxide, polyethylene, and polydimethylsiloxane (PDMS). The length (parallel to the flow) and the depth (perpendicular to the flow such that it would be extending out of the page in FIG. 1) of the flow chambers may be extended to enhance the separation effect (e.g., a device with a length of tens of meters may be preferable to a device with a length of one meter). The channel height may be minimized (e.g. 1 cm); minimizing the height may also minimize the cost of the energy used to pump the flow of the solution in the device.

The porous layer that separates the main sub-chamber from the second sub-chamber can be made with porous films, such as silicon nitride, silicon dioxide, graphene, metal-organic-framework, and polymer membranes with arrays of nanopores. The diameter of the nanopores may be on the scale of several nanometers. The porous layer that separates the main sub-chamber from the first sub-chamber can be made with a proton exchange membrane (PEM) that conducts protons and acts like a barrier for gas molecules. A common PEM product is sulfonated tetrafluoroethylene-based fluoropolymer-copolymer. The porous layers may be supported by pillars built in the chambers of the device.

Figure 2:
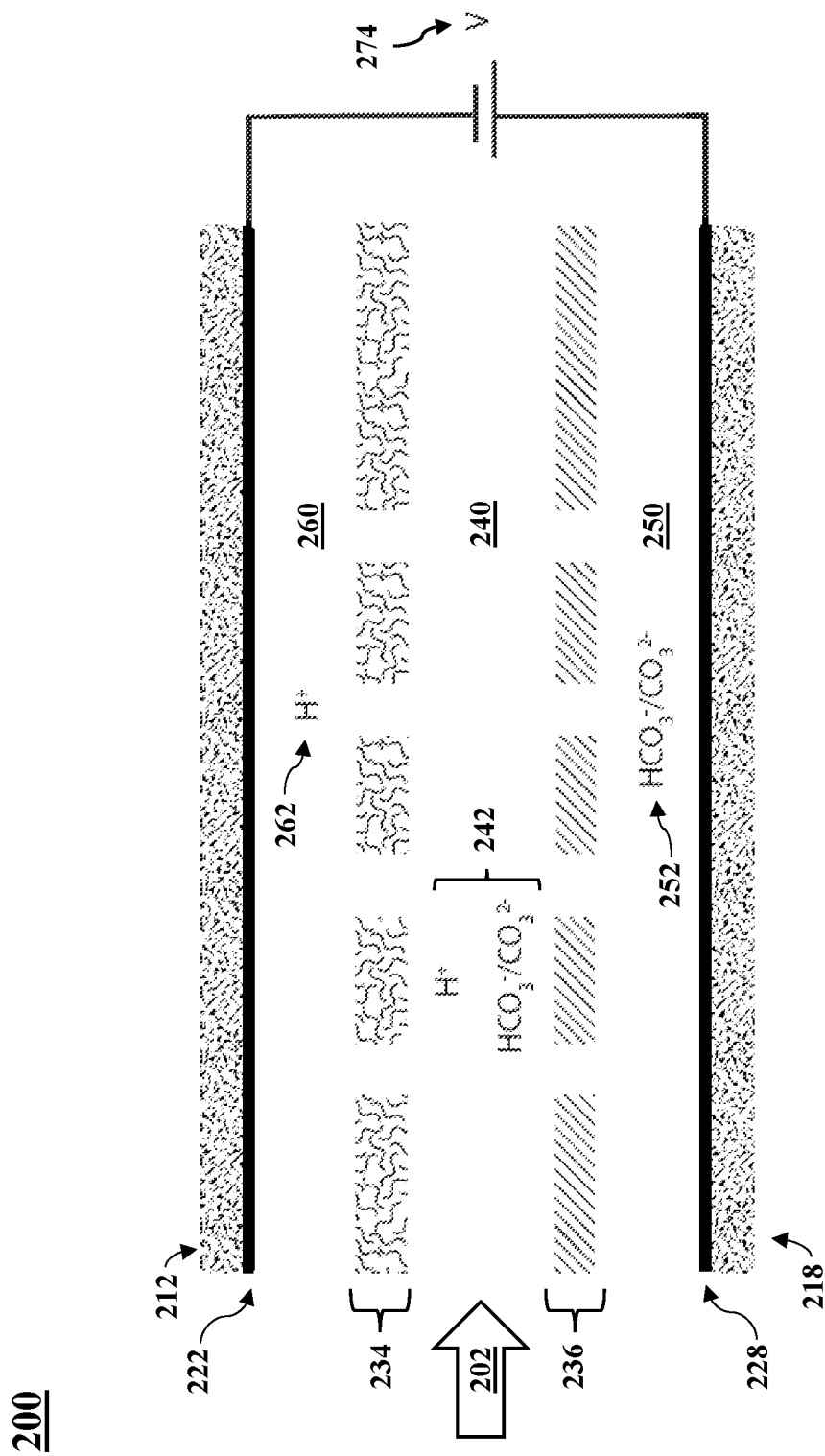
FIG. 2 depicts a fluidic device in accordance with some embodiments of the present disclosure.

FIG. 2 depicts a fluidic device 200 in accordance with some embodiments of the present disclosure. The fluidic device 200 includes a chamber with a main sub-chamber 240, a first sub-chamber 260, and a second sub-chamber 250. The main sub-chamber 240 is separated from the other sub-chambers with porous layers 234 and 236. The fluidic device 200 includes channel walls 212 and 218. The channel walls 212 and 218 may have electrodes 222 and 228, respectively, on them or adjacent to them.

Additional biasing voltages may further attract anions 252 and cations 262 to the desired sub-chambers. A biasing voltage 274 may be applied to the electrodes 222 and 228 near the channel walls 212 and 218 adjacent each sub-chamber thereto to draw ions thereto. In this embodiment, the only electrodes 222 and 228 are on or adjacent to the channel walls 212 and 218, respectively. The majority of the biasing voltage 274 may stay in the adjacent sub-chamber because the porous layers may absorb it, resulting in a weak electric field relative to the electric field that may be applied in the embodiment shown in FIG. 1, and the motion of the ions may be more diffusive than it might be in an embodiment such as the one shown in FIG. 1. The weak electric field may be compensated for by, for example, lengthening the chamber such that the drifting surpasses the diffusion, assisting the ions to arrive in the desired sub-channel.

An input 202 may be submitted to the fluidic device 200. Molecules (e.g., carbon dioxide) in the input 202 may react with fluid in the fluidic device 200 to form a solution 242 of anions 252 and cations 262. In some embodiments, the fluid may include water; carbon dioxide molecules in the input 202 may react with the water in the fluid to form carbonate ions and bicarbonate as the anions 252 and hydrons as the cations 262. It may be preferable for the water to be deionized and/or demineralized to minimize or even eliminate buildup in the chamber, preventing contamination of the chamber with precipitate and thereby enabling continuous operation of the fluidic device 200 and minimizing downtime for cleaning and/or maintenance.

In the second sub-chamber 250, anions 252 may be collected. The reaction of Equation 3 is driven toward carbonate ion. Fluid expelled from the second sub-chamber 250 may be the input 202 in another fluidic device 200 to further concentrate the carbonate ions in the second sub-chamber 250 of the subsequent fluidic device 200 and further concentrate the hydrons in the first sub-chamber 260 of that device.

In some embodiments, multiple systems may be used in sequence to, for example, maximize concentration of output solutions. For example, the fluidic device 200 shown in FIG. 2 may be used, and an output from the central sub-chamber 240 may be fed into the main sub-chamber of the fluidic device 100 shown in FIG. 1. In some embodiments, more devices may be used in the sequence, other embodiments may be preferred, and/or multiple of the same embodiment may be preferred. In some embodiments, it may be preferable to further concentrate the fluid from a first sub-chamber 160 and 260 or a second sub-chamber 150 and 250; in such embodiments, the fluid targeted for further concentration (e.g., the outflow from a first sub-chamber 160 and 260 or a second sub-chamber 150 and 250) may be directed into another fluidic device.

Additionally, the present disclosure provides methods of molecular extraction. A method in accordance with the present disclosure may include dissolving gaseous molecules in water to form an aqueous solution with cations and anions and submitting the aqueous solution to a chamber. The method may include guiding the cations to a first sub-chamber of the chamber to form a concentrated cationic solution and expelling the concentrated cationic solution.

The method may further include using an inert electrode to attract the cations to the first sub-chamber. The method may further include collecting the anions in a second sub-chamber of the chamber. The method may further include catching the concentrated anionic solution in a reservoir and, in the reservoir, mixing the concentrated anionic solution with a precipitation-inducing solution to form a precipitate. The method may further include preventing accumulation of the cations and the anions with a pressure-driven flow of the aqueous solution.

Figure 3:
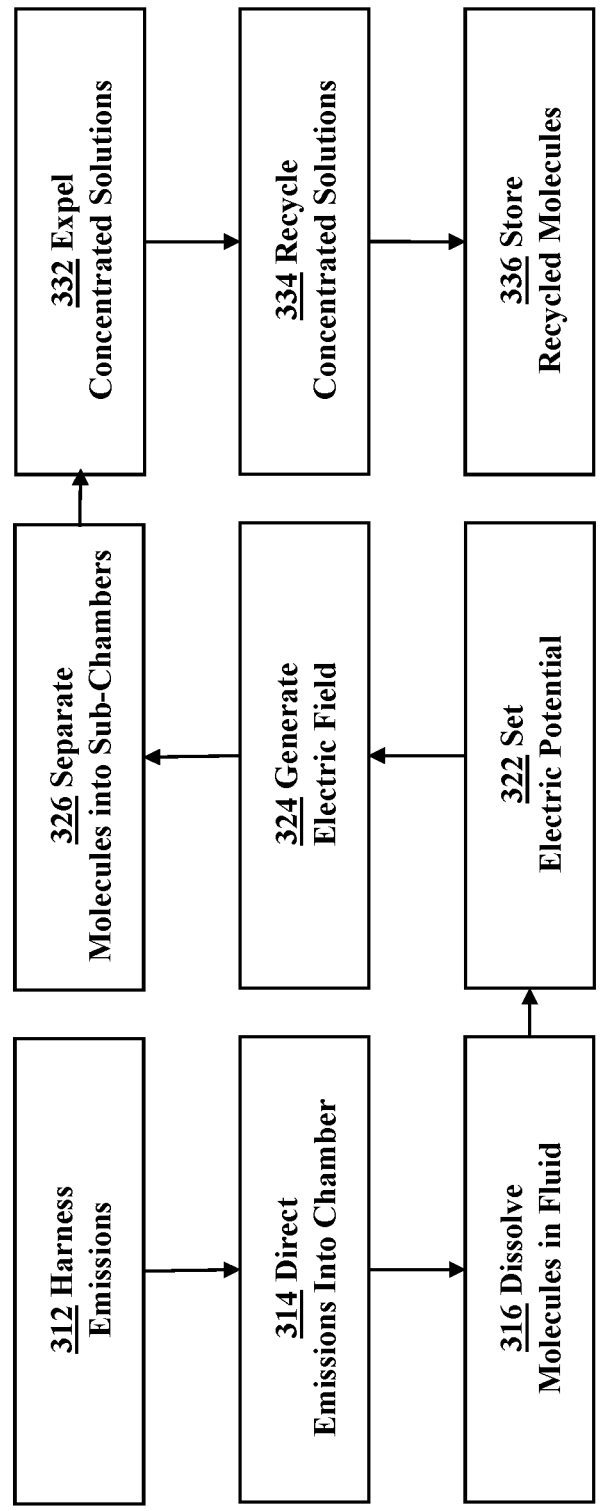
FIG. 3 illustrates a molecular extraction method in accordance with some embodiments of the present disclosure.

FIG. 3 illustrates a method 300 of molecular extraction using fluidic electrophoresis in accordance with some embodiments of the present disclosure. The method 300 includes harnessing emissions 312 containing molecules which may be separated and/or otherwise reacted with. The method may include directing the emissions into a chamber 314 and dissolving the molecules in fluid 316 contained in the chamber. The molecules dissolved in the fluid may react to form ionic molecules. For example, the emissions may include carbon dioxide (the molecules) which may be reacted in the chamber with water (the fluid) to form hydrons, bicarbonate, and carbonate (ionic molecules).

The method includes setting an electric potential 322 on and/or near the extremities of the chamber and generating an electric field 324. The method includes separating the molecules into sub-chambers 326 of the chamber such that anions enter one sub-chamber and cations enter a different sub-chamber. The electric field may facilitate the movement of anions and cations to different sub-chambers.

The method may include expelling the concentrated solutions 332 from the chamber. In some embodiments, the anionic solution is expelled into one reservoir and the cationic solution is expelled into a different reservoir. In some embodiments, one or more of the expelled solutions may be considered emissions and re-enter the method to further concentrate the solutions; for example, a cationic solution may be expelled from the exit of one chamber and into the entrance of another chamber to further concentrate the solution and/or react it with the same or different reactants to form other molecules.

The method may further include recycling the concentrated solutions 334. This may include, for example, molecular recovery of the expelled solutions, reacting the expelled solutions with other reactants to form other solutions for collection, reacting the expelled solutions with other reactants to form one or more precipitates for recovery, and the like. Recycling the concentrated solutions 334 may generally refer to preparing the concentrated solutions for another use including immediate use, storage, or some combination thereof. In the embodiment shown in FIG. 3, the method includes storing the recycled molecules 336. Some molecules may undergo a method in accordance with the present disclosure such that the molecules may be stored in a stable form that is also useful in one or more processes.

In some embodiments, carbon dioxide may be submitted to a chamber, dissolved in water to form bicarbonate, carbonate ions, and hydron molecules. The molecules may be drawn to different portions of the chamber using an electric field, and the molecules may be concentrated in their respective portions of the chamber. The solutions rich with these molecules may be expelled from their respective portions of the chamber into reservoirs. In the reservoirs, the solutions may be used as reactants to form other desirable compounds. For example, in the anionic reservoir, hydrons may be used to generate hydrochloric acid and/or sulfuric acid. In the cationic reservoir, carbonate ions may be reacted with other components to generate sodium carbonate, magnesium carbonate, and/or calcium carbonate.

A method in accordance with the present disclosure may include dissolving emissions in a fluid in a chamber to form an ionic solution and submitting the ionic solution to the chamber. The method may include concentrating first ions in the ionic solution to a first sub-chamber of the chamber to form a concentrated solution and expelling the concentrated solution.

The method may further include guiding the first ions to the first sub-chamber with an electric field. The method may additionally include setting the electric field with an inert electrode. The method may further include filtering the second ions through a selectively porous barrier into a second sub-chamber. The method may further include filtering the first ions through a porous membrane in the chamber. The method may further include electrophoretically driving the first ions to the first sub-chamber and second ions to a second sub-chamber.

A computer program product in accordance with the present disclosure may include a computer readable storage medium having program instructions embodied therewith. The program instructions may be executable by a processor to cause the processor to perform a function. The function may include dissolving gaseous molecules in water to form an aqueous solution with cations and anions and submitting the aqueous solution to a chamber. The function may include guiding the cations to a first sub-chamber of the chamber to form a concentrated cationic solution and expelling the concentrated cationic solution.

The function of the computer program product may further include using an inert electrode to attract the cations to the first sub-chamber.

The function of the computer program product may further include collecting the anions in a second sub-chamber of the chamber.

The function of the computer program product may further include catching the concentrated anionic solution in a reservoir and, in the reservoir, mixing the concentrated anionic solution with a precipitation-inducing solution to form a precipitate.

The function of the computer program product may further include preventing accumulation of the cations and the anions with a pressure-driven flow of the aqueous solution.

Figure 4:
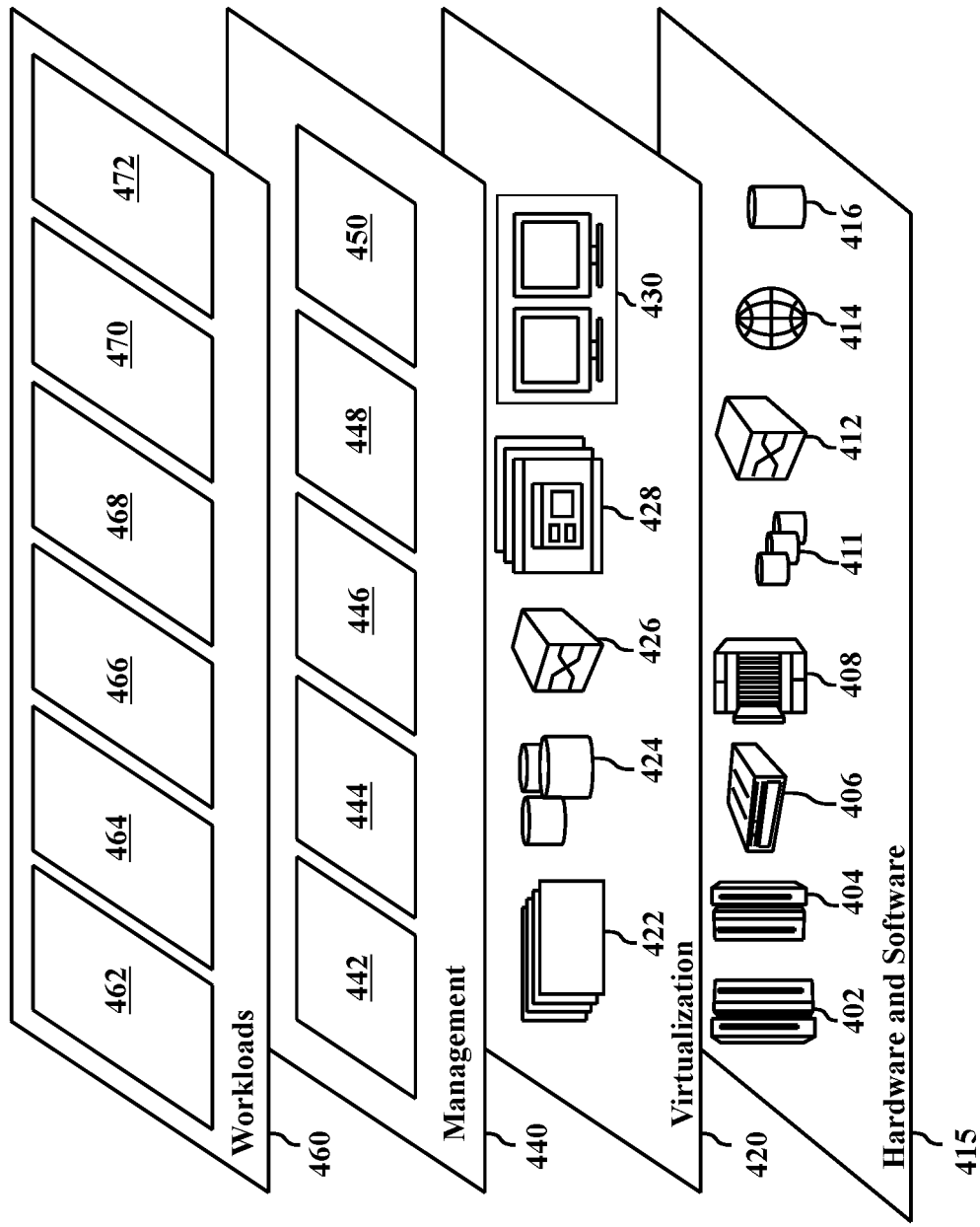
FIG. 4 depicts abstraction model layers, in accordance with embodiments of the present disclosure.

FIG. 4 illustrates abstraction model layers 400 provided by a cloud computing environment in accordance with embodiments of the present disclosure. It should be understood in advance that the components, layers, and functions shown in FIG. 4 are intended to be illustrative only and embodiments of the disclosure are not limited thereto. As depicted below, the following layers and corresponding functions are provided.

Hardware and software layer 415 includes hardware and software components. Examples of hardware components include: mainframes 402; RISC (Reduced Instruction Set Computer) architecture-based servers 404; servers 406; blade servers 408; storage devices 411; networks and networking components 412; and one or more fluidic electrophoresis devices 416. In some embodiments, software components include network application server software 414.

Virtualization layer 420 provides an abstraction layer from which the following examples of virtual entities may be provided: virtual servers 422; virtual storage 424; virtual networks 426, including virtual private networks; virtual applications and operating systems 428; and virtual clients 430.

In one example, management layer 440 may provide the functions described below. Resource provisioning 442 provides dynamic procurement of computing resources and other resources that are utilized to perform tasks within the cloud computing environment. Metering and pricing 444 provide cost tracking as resources and are utilized within the cloud computing environment as well as billing or invoicing for consumption of these resources. In one example, these resources may include application software licenses. Security provides identity verification for cloud consumers and tasks as well as protection for data and other resources. User portal 446 provides access to the cloud computing environment for consumers and system administrators. Service level management 448 provides cloud computing resource allocation and management such that required service levels are met. Service level agreement (SLA) planning and fulfillment 450 provide pre-arrangement for, and procurement of, cloud computing resources for which a future requirement is anticipated in accordance with an SLA.

Workloads layer 460 provides examples of functionality for which the cloud computing environment may be utilized. Examples of workloads and functions which may be provided from this layer include: mapping and navigation 462; software development and lifecycle management 464; virtual classroom education delivery 466; data analytics processing 468; transaction processing 470; and molecular extraction via fluidic electrophoresis 472.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although the present disclosure has been described in terms of specific embodiments, it is anticipated that alterations and modification thereof will become apparent to the skilled in the art. The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or the technical improvement over technologies found in the marketplace or to enable others of ordinary skill in the art to understand the embodiments disclosed herein. Therefore, it is intended that the following claims be interpreted as covering all such alterations and modifications as fall within the true spirit and scope of the disclosure.

What is claimed is:

1. A method, said method comprising:
dissolving gaseous molecules in water to form an aqueous solution with cations and anions;
submitting said aqueous solution to a chamber;
guiding said anions to a first sub-chamber of said chamber to form a concentrated anionic solution;
collecting said cations in a second sub-chamber of said chamber; and
expelling said concentrated anionic solution.

2. The method of claim 1, further comprising:
using an inert electrode to attract said anions to said first sub-chamber.

3. The method of claim 1, further comprising:
catching said concentrated anionic solution in a reservoir; and
mixing, in said reservoir, said concentrated anionic solution with a precipitation-inducing solution to form a precipitate.

4. The method of claim 1, further comprising:
preventing accumulation of said cations and said anions with a pressure-driven flow of said aqueous solution.

5. A method, said method comprising:
dissolving gaseous emissions in a fluid in a chamber to form an ionic solution;
concentrating first ions in said ionic solution to a first sub-chamber of said chamber to form a concentrated solution;
filtering said first ions through a porous membrane in said chamber; and
expelling said concentrated solution.

6. The method of claim 5, further comprising:
guiding said first ions to said first sub-chamber with an electric field.

7. The method of claim 6, further comprising:
setting said electric field with an inert electrode.

8. The method of claim 5, further comprising:
filtering second ions through a selectively porous barrier into a second sub-chamber.

9. The method of claim 5, further comprising:
driving, electrophoretically, said first ions to said first sub-chamber and second ions to a second sub-chamber.

* * * * *